Patented Apr. 20, 1937

2,077,397

UNITED STATES PATENT OFFICE 2,077,397

HARD SURFACING WELDROD

Magnus Christensen, Barberton, Ohio, assignor to The Babcock & Wilcox Company, Newark, N. J., a corporation of New Jersey No Drawing. Application July 18, 1934, Serial No. 735,827

8 Claims. (Cl. 219—8)

This invention relates to weldrods and more particularly to those of the coated or covered type, and it has for a main object to produce a weldrod of this charcter which provides a deposit having high wear-resisting qualities and at the same time is comparatively cheap to manufacture.

According to one example of my invention I provide a weldrod having a core formed of a commercial form of inexpensive steel; for example, a low carbon steel wire or rod, or an inexpensive steel wire or rod of low alloy content such as the chrome-nickel, 3.5% nickel, and 1.5% manganese steels. To this core is applied a mixture containing a substantial amount of silicon carbide and a binding agent in sufficient quantities to cause the mixture to adhere to the rod. When a weldrod of this character is used as an electrode in electric arc welding, the silicon and carbon in the coating, when fused in the arc, will alloy with the steel core to produce a steel deposit which is high in silicon and carbon and hence one having high wear resisting qualities.

Preferably, the silicon carbide used is a well known commercial waste product containing approximately 94% to 96% silicon carbide, the balance being lime, magnesia, and free silicon. As a practical example of how the rod may be formed the silicon carbide is powdered and mixed with a suitable binder, for example, sodium silicate in sufficient quantity to give proper consistency for extrusion. The mixture thus formed is extruded on the inexpensive steel wire or rod and then air dried and then baked at 450° F.

According to a second form of my invention I provide, as before, the comparatively inexpensive steel wire or rod, and apply to the rod a mixture containing the silicon carbide and the binding agent and in addition a fluxing agent containing at least one primarily basic metal salt, for example, calcium carbonate or limestone. A typical example of such a mixture is as follows:—silicon carbide, 50 parts; calcium carbonate, 15 parts; and enough sodium silicate to give proper consistency for extrusion. As before, the silicon is powdered and is mixed dry with the calcium carbonate. The proper amount of sodium silicate is added and the mixture is then extruded on the wire and then air dried and then baked at 450° F.

When the above described second form of rod is used, a steel deposit is provided which is high in silicon and carbon and is substantially free of porosity, the latter being due to the action of the fluxing agent in lowering the fusion point of the coating. A technical analysis of a specimen of metal deposited by a weldrod having a mild steel core coated with this mixture is as follows:

|  | Per cent |
|---|---|
| Carbon | 1.24 |
| Silicon | 6.30 |

The silicon content of the deposited metal may be varied according to a third form of my invention by the addition to the coating mixture of a reacting material such, for example, as calcium fluoride which combines with a portion of the silicon of the silicon carbide and causes volatilization of the silicon as fluoride, thereby reducing the amount of silicon taken up by the deposited metal. A typical example of such a mixture is, 50 parts silicon carbide, 15 parts calcium carbonate (limestone), 10 parts calcium fluoride (natural), and enough sodium silicate to mix with the dry materials to give proper consistency for extrusion. The mixture may be extruded on the inexpensive steel rod and dried as before. A technical analysis of a specimen of metal deposited from a weldrod having a core of mild steel coated with the last mentioned mixture is as follows:

|  | Per cent |
|---|---|
| Carbon | .72 |
| Silicon | 2.32 |

A weldrod according to any of the examples of my invention given above is comparatively inexpensive to manufacture, because any of the commercial types of mild steel, or low alloy steel welding wire may be used, and the coating is formed of materials which are low in cost and easily applied to the wire. On the other hand, a weldrod formed in this manner provides a steel deposit of high silicon, high carbon content and hence one which is exceptionally good in resisting wear.

The hardness of the deposit when the inexpensive low alloy steel wire, referred to above, is used, is greater than when a mild steel wire is used. With commercial mild steel rods, Brinnell hardness of deposited beads ranges from 392 up when the coating compositions hereinbefore set forth are used for arc deposition of the metal; while with the use of low alloy steel rods and rod adherent coatings of the compositions hereinbefore set forth, beads are formed having a Brinnell hardness ranging from 594 up.

Weldrods manufactured according to the present invention may be used to advantage in a variety of ways. For example my improved form of weldrod may be used to provide a hard surface on articles subjected to wear, such as fan blades, tools, etc.

It is to be understood that the proportions of the formulae specifically given above may be varied to suit different conditions without departing from the present invention. Also, it is to be understood that the sodium silicate used as a binder may be replaced with any other agglutinating medium, such, for example, as glue and/or water soluble resin imparting plasticity while causing the ingredients to adhere to the rod.

I claim—

1. A weldrod comprising a steel rod provided with a rod-adherent coating composition inclusive of a larger portion of silicon carbide than of any other initially solid ingredient.

2. A weldrod comprising a low carbon steel rod provided with a rod-adherent coating composition inclusive of a larger portion of silicon carbide than of any other initially solid ingredient.

3. A weldrod comprising a low alloy content steel rod provided with a rod-adherent coating composition inclusive of a larger portion of silicon carbide than of any other initially solid ingredient.

4. A weldrod comprising a steel rod provided with a rod-adherent coating composition containing silicon carbide in larger proportion than of any other initially solid ingredient and a flux containing at least one primarily basic metal salt and a material capable of readily reacting with the silicon in the silicon carbide to reduce the silicon content of metal deposited by the rod.

5. A weldrod comprising a steel rod provided with a rod-adherent coating composition containing silicon carbide in larger proportion than of any other initially solid ingredient and at least one primarily basic metal salt and calcium fluoride.

6. A weldrod comprising a steel rod provided with a rod-adherent coating composition containing silicon carbide in larger proportion than of any other initially solid ingredient and a flux containing calcium carbonate and calcium fluoride.

7. A weldrod comprising a steel rod provided with a rod-adherent coating of the following mixture:

|  | Parts |
|---|---|
| Silicon carbide | 50 |
| Calcium carbonate | 15 |
| Binder. | |

8. A weldrod comprising a steel rod provided with a rod-adherent coating of the following mixture:

|  | Parts |
|---|---|
| Silicon carbide | 50 |
| Calcium carbonate | 15 |
| Calcium fluoride | 10 |
| Binder. | |

MAGNUS CHRISTENSEN.